United States Patent
Matsui et al.

(10) Patent No.: US 10,817,480 B2
(45) Date of Patent: Oct. 27, 2020

(54) HIERARCHICAL STORAGE MANAGEMENT SYSTEM

(71) Applicant: NEC Corporation, Minato-ku, Tokyo (JP)

(72) Inventors: Yasutaka Matsui, Tokyo (JP); Mitumasa Sugihara, Tokyo (JP); Shinichi Iwata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 243 days.

(21) Appl. No.: 15/900,925

(22) Filed: Feb. 21, 2018

(65) Prior Publication Data

US 2018/0260413 A1    Sep. 13, 2018

(30) Foreign Application Priority Data

Mar. 13, 2017 (JP) .................. 2017-047030

(51) Int. Cl.
*G06F 17/00* (2019.01)
*G06F 16/185* (2019.01)
*G06F 16/11* (2019.01)

(52) U.S. Cl.
CPC .......... *G06F 16/185* (2019.01); *G06F 16/119* (2019.01); *Y02D 10/45* (2018.01)

(58) Field of Classification Search
CPC ...... G06F 16/11; G06F 16/185; G06F 16/119; G06F 3/0647; Y02D 10/45
See application file for complete search history.

(56) References Cited

U.S. PATENT DOCUMENTS

| 9,311,008 | B2* | 4/2016 | Sauber | G06F 12/0895 |
| 2002/0156968 | A1* | 10/2002 | Haustein | G06F 3/0647 711/111 |
| 2011/0099346 | A1* | 4/2011 | Toshine | G06F 3/061 711/162 |
| 2014/0172792 | A1* | 6/2014 | Kabano | G06F 16/1844 707/625 |
| 2016/0124678 | A1 | 5/2016 | Hasegawa et al. | |
| 2016/0162216 | A1 | 6/2016 | Nukariya et al. | |

(Continued)

FOREIGN PATENT DOCUMENTS

| JP | H09-297699 A | 11/1997 |
| JP | 2007-272721 A | 10/2007 |

(Continued)

OTHER PUBLICATIONS

Masaru Iritani et al., Effects on Performance and Energy Reduction by File Relocation based on File-access Correlations, EDDBT-ICDT' 12: Proceedings of the 2112 Joint EDBT/ICDT Workshops, pp. 79-86, Mar. (Year: 2012).*

(Continued)

*Primary Examiner* — Greta L Robinson (57) ABSTRACT

A hierarchical storage management system including primary storage and secondary storage includes a determinator and a relocator. The determinator makes a determination, on the basis of the size of a file saved in the primary storage and an access interval time, whether or not moving the file from the primary storage to the secondary storage can reduce consumed energy. The relocator moves the file from the primary storage to the secondary storage in accordance with the determination.

3 Claims, 8 Drawing Sheets

(56) References Cited

U.S. PATENT DOCUMENTS

2018/0088870 A1* 3/2018 Lv .................. G06F 3/0605
2019/0087342 A1* 3/2019 Masuda ............ G06F 12/0871

FOREIGN PATENT DOCUMENTS

JP      2011-210024 A    10/2011
JP      2016-110305 A     6/2016

OTHER PUBLICATIONS

John Salasin, Hierarchical Storage in Information Retrieval, Communications of the ACM, vol. 16 Issue 5, pp. 291-295, May (Year: 1973).*
Japanese Office Action for JP Application No. 2017-047030 dated May 28, 2019 with English Translation.

* cited by examiner

HIERARCHICAL STORAGE MANAGEMENT SYSTEM

INCORPORATION BY REFERENCE

This application is based upon and claims the benefit of priority from Japanese patent application No. 2017-047030, filed on Mar. 13, 2017, the disclosure of which is incorporated herein in its entirety by reference.

TECHNICAL FIELD

The present invention relates to a hierarchical storage management system that manages hierarchical storage including primary storage and secondary storage, a file movement method, and a program.

BACKGROUND ART

Various systems that manage hierarchical storage including primary storage and secondary storage have been proposed and put to practical use. Such a hierarchical storage management system executes data relocation, which is to move a file from primary storage to secondary storage.

For example, Patent Document 1 discloses hierarchical storage that includes primary storage including an HDD (Hard Disk Drive) and an SSD (Solid State Drive) and secondary storage including a sequential access device such as a tape drive. According to Patent Document 1, a file is moved from the primary storage to the secondary storage when the usage rate of the HDD exceeds a specific threshold or at the time specified by the user.

Further, Patent Document 2 discloses hierarchical storage that includes primary storage including a RAID device using an expensive disk with high access speed and secondary storage including a RAID device using an inexpensive disk with low access speed or a magnetic tape device. According to Patent Document 2, data with reduced access frequency and data with prolonged access time interval is moved from the primary storage to the secondary storage.

Patent Document 1: U.S. Patent Application Publication No. 2016124678. A1(JP Patent 6075571)

Patent Document 2: Japanese Unexamined Patent Application Publication No. JP-A 2007-272721

Along with spread of the Internet and globalization in recent years, a required storage capacity has increased and, accordingly, the consumed energy of hierarchical storage has been increasing year by year. However, it is difficult to suppress the consumed energy of hierarchical storage by data relocation as mentioned above, that is, the method of moving a file from primary storage to secondary storage when the usage rate of an HDD exceeds a specific threshold or at the time specified by the user, or when access frequency is reduced and an access time interval is prolonged.

SUMMARY OF THE INVENTION

An object of the present invention is to provide a hierarchical storage management system that solves the above-mentioned problem.

A hierarchical storage management system as an aspect of the present invention is a hierarchical storage management system including primary storage and secondary storage. The hierarchical storage management system includes:

a determinator for, on a basis of a size of a file saved in the primary storage and an access interval time, making a determination whether or not moving the file from the primary storage to the secondary storage can reduce consumed energy; and a relocator for, in accordance with the determination, moving the file from the primary storage to the secondary storage.

Further, a file movement method as another aspect of the present invention is a file movement method by a hierarchical storage management system including primary storage and secondary storage. The file movement method comprises:

on a basis of a size of a file saved in the primary storage and an access interval time, making a determination whether or not moving the file from the primary storage to the secondary storage can reduce consumed energy; and in accordance with the determination, moving the file from the primary storage to the secondary storage.

Further, a non-transitory computer-readable medium storing a program as another aspect of the present invention includes instructions for causing a computer to function as a determinator and a relocator. The computer manages hierarchical storage including primary storage and secondary storage.

The determinator makes a determination, on a basis of a size of a file saved in the primary storage and an access interval time, whether or not moving the file from the primary storage to the secondary storage can reduce consumed energy.

The relocator moves the file from the primary storage to the secondary storage in accordance with the determination.

With the configurations stated above, the present invention can suppress the consumed energy of hierarchical storage by data relocation.

EXEMPLARY EMBODIMENT

Next, an exemplary embodiment of the present invention will be described in detail with reference to the drawings.

First Exemplary Embodiment

Figure 1:
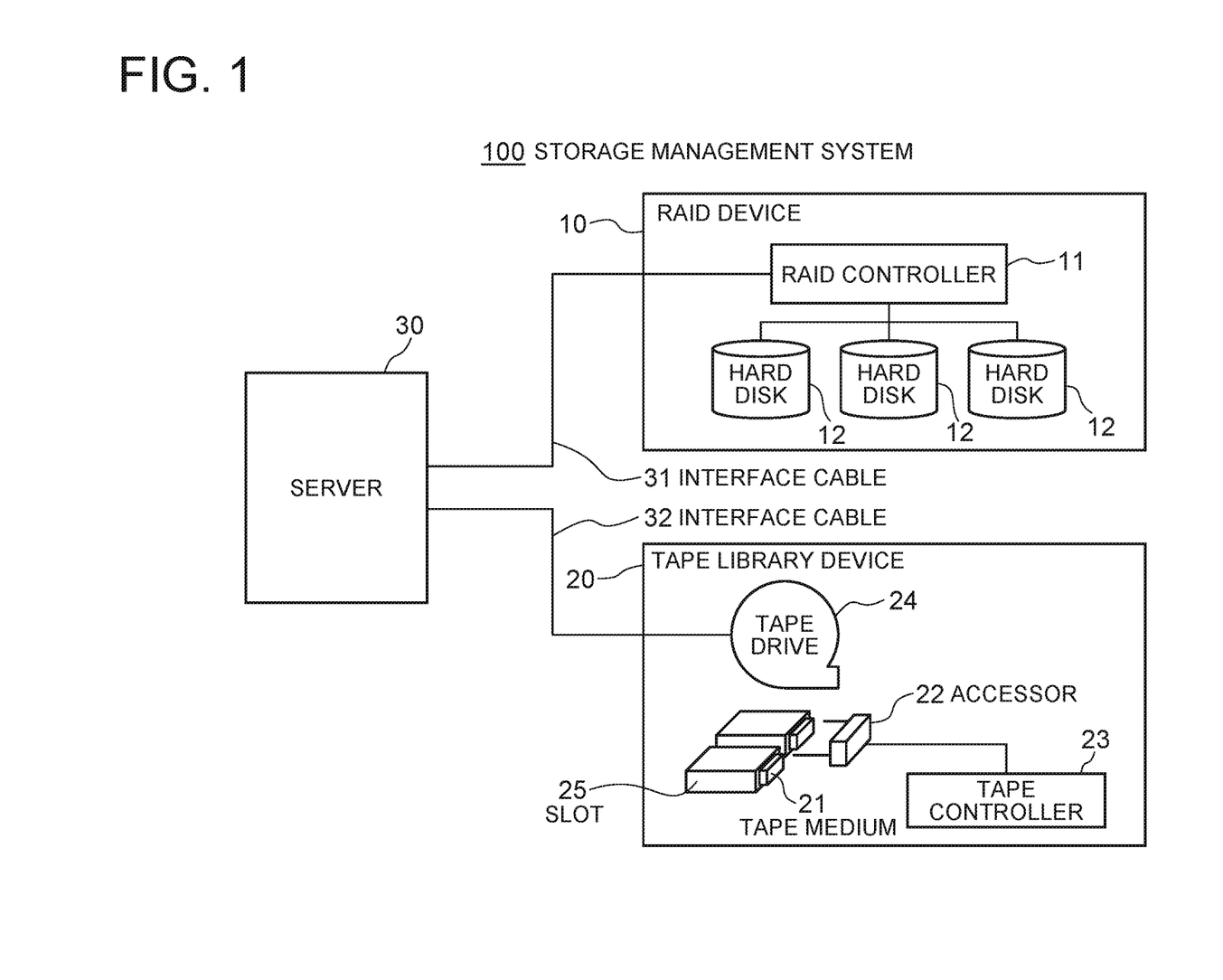
FIG. 1 is a block diagram of a hierarchical storage management system according to a first exemplary embodiment of the present invention.

With reference to FIG. 1, a hierarchical storage management system 100 according to a first exemplary embodiment of the present invention includes a RAID (Redundant Array of Inexpensive Disks) device 10, a tape library device 20, and a server 30.

The RAID device 10 is primary storage included by hierarchical storage. The RAID storage 10 includes a RAID controller 11 and a plurality of hard disks 12. The RAID controller 11 is connected to the server 30 by an interface cable 31.

The tape library device 20 is secondary storage included by the hierarchical storage. The tape library device 20 includes a tape medium 21, an accessor 22, a tape controller 23, a tape drive 24, and a slot 25. The tape drive 24 is connected to the server 30 by an interface cable 32.

The server 30 is a computer that processes data. A file system supported by the OS of the server 30 is configured so that the server 30 can access data of the RAID device 10. Moreover, a file system such as LTFS (Linear Tape File System) is configured so that the server 30 can access data of the tape library device 20. Meanwhile, the above data access methods are merely examples. The method for data access from the server 30 to the RAID device 10 and the method for data access from the server 30 to the tape library device 20 are not limited to the above examples.

Figure 6:
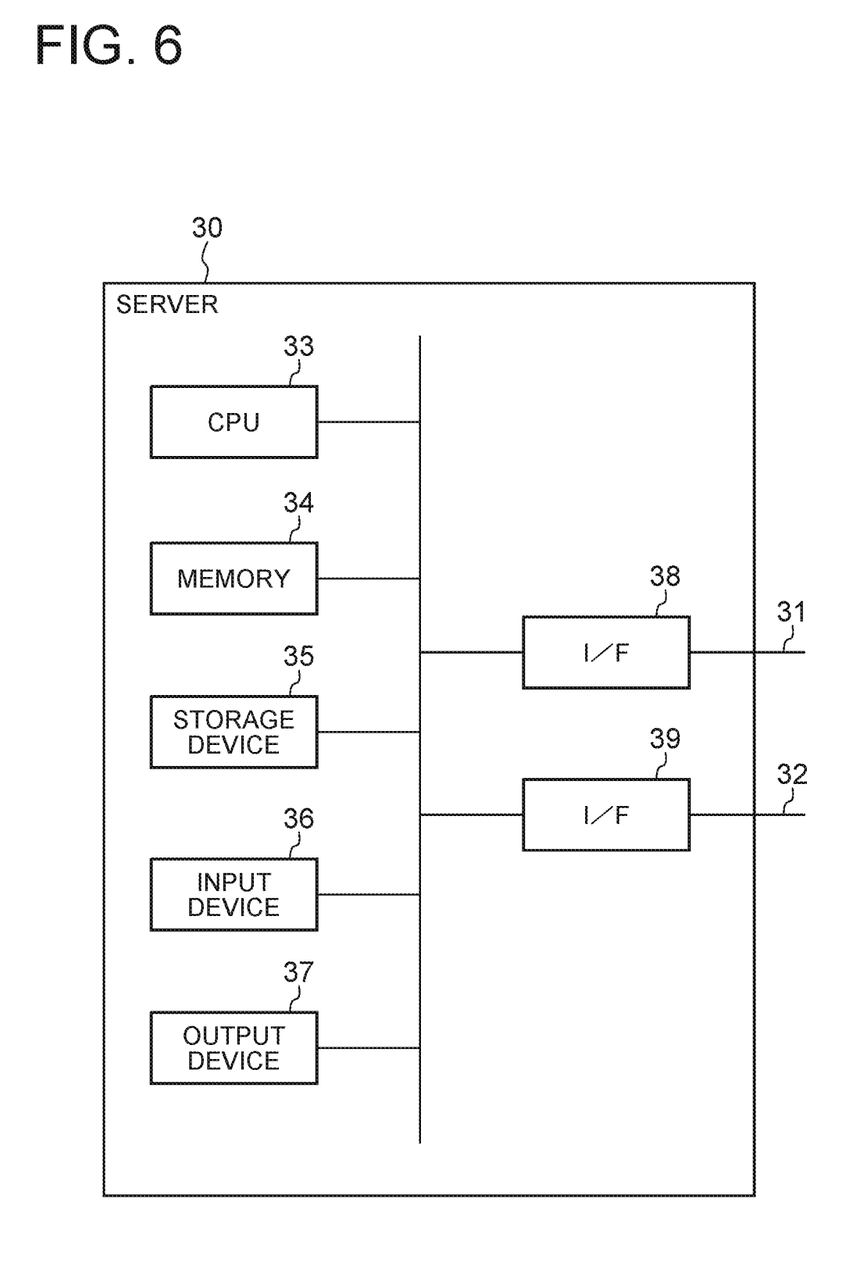
FIG. 6 is a diagram showing an example of a hardware configuration of the server in the first exemplary embodiment of the present invention.

FIG. 6 shows an example of a hardware configuration of the server 30. In this example, the server 30 includes a CPU (Central Processing Unit) 33, a memory 34 such as a RAM (Random Access Memory), a storage device 35 such as a ROM (Read Only Memory), an HDD and a flash memory, an input device 36 such as a keyboard, an output device 37 such as a liquid crystal display, and interfaces 38 and 39 such as a network interface and an inputoutput interface. The interface 38 is connected to the RAID device 10 via the interface cable 31. The interface 39 is connected to the tape library device 20 via the interface cable 32.

The server 30 retrieves a program stored in the storage device 35 and deploys it to the memory 34 under control of the CPU 33, thereby realizing a desired function and process.

Figure 7:
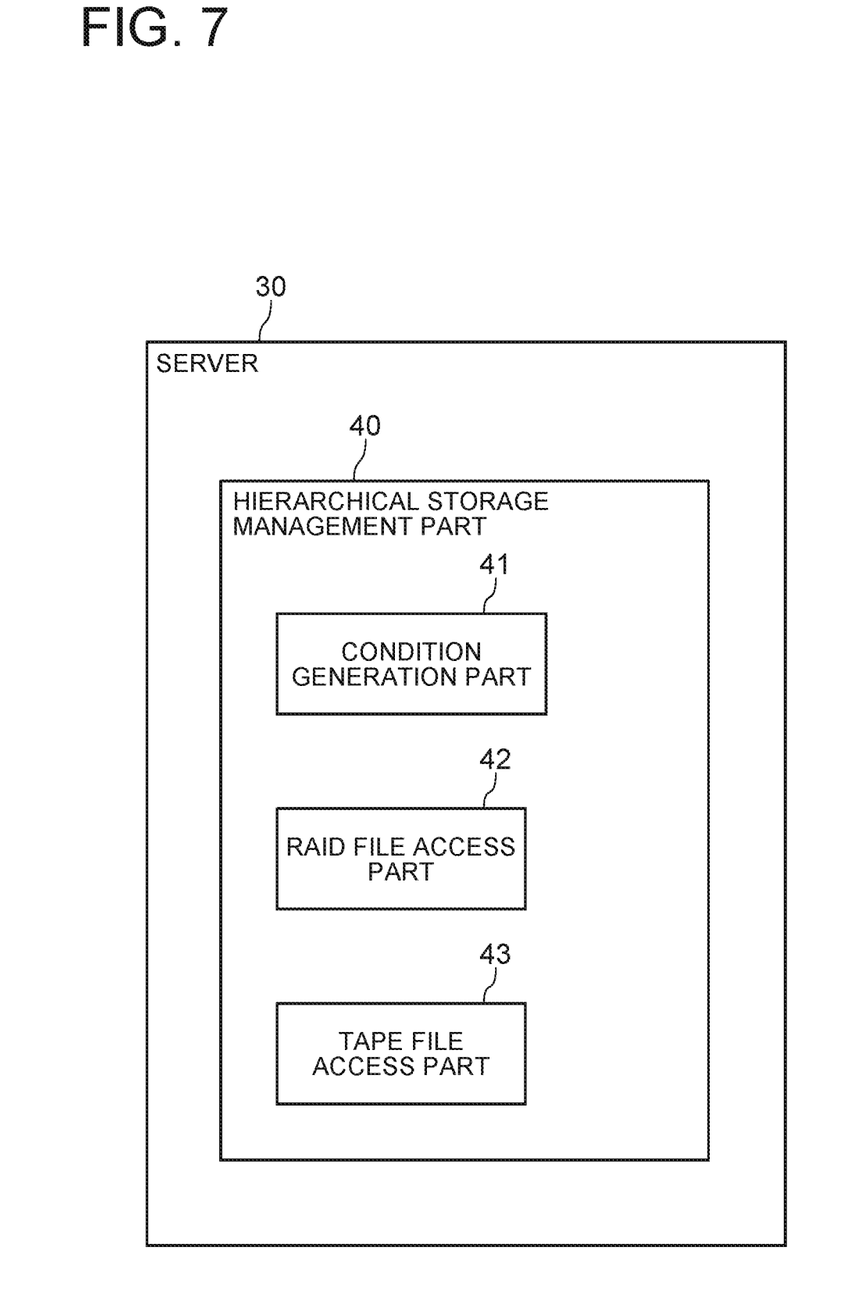
FIG. 7 is a block diagram showing functions included by the server in the first exemplary embodiment of the present invention.

FIG. 7 shows an example of functions included by the server 30. In this example, the server 30 has a hierarchical storage management part 40. The hierarchical storage management part 40 has a condition generation part 41, a RAID file access part 42, and a tape file access part 43.

The condition generation part 41 is configured to generate a condition for determining a file save destination that is excellent in viewpoint of consumed energy on the basis of a file size and a file access interval time. One of the candidates of the file save destination is the RAID device 10, and the other is the tape library device 20.

The RAID file access part 42 is configured to read and write a file saved in the RAID device 10. Moreover, the RAID file access part 42 is configured to determine whether or not to move a file saved in the RAID device 10 to the tape library device 20 on the basis of a condition generated by the condition generation part 41. Moreover, the RAID file access part 42 is configured to move a five saved in the RAID device 10 to the tape library device 20 in accordance with the above determination.

The tape file access part 43 is configured to read and write a file saved in the tape library device 20. Moreover, the tape file access part 43 is configured to determine whether or not to move a file saved in the tape library device 20 to the RAID device 10 on the basis of a condition generated by the condition generation part 41. Moreover, the tape file access part 43 is configured to move a file saved in the tape library device 20 to the RAID device 10 in accordance with the above determination.

Below, the functions of the condition generation part 41, the RAID file access part 42 and the tape file access part 43 will be described in detail.

First, a method for generating a condition for determining a file save destination that is excellent in viewpoint of consumed energy among the RAID device 10 and the tape library device 20 on the basis of a file size and a file access interval time will be described.

With reference to FIG. 1, for primary storage, the RAID device 10 is used as a disk. To each part of the RAID device 10, in general, electric power is supplied at all times for the purpose of data retention and accessibility. The target of electric power supply is the RAID controller 11 and the hard disks 12. The server 30 and the RAID controller 11 are connected by the interface cable 31. The RAID device 10 accepts a data read request and a data write request from the server 30 through the interface cable 31.

At the time of reading data saved in the hard disk 12, the RAID device 10 reads the data by seeking, that is, moving a magnetic head in the hard disk 12 to a position where the data is saved, causes the RAID controller 11 to process the read data, and returns the data to the server 30 having issued the read request.

Let P(Dread) (watt/gigabyte) be power consumption required to read a unit data capacity by the RAID device 10. P(Dread) is given by the following equation, assuming that an effective capacity of the RAID device 10 is S(D) (gigabyte) and the power consumption of the RAID device 10 is P(D) (watt).

$$P(Dread)=P(D)/S(D) \text{ (watt/gigabyte)} \qquad \text{equation 1-1}$$

Further, let T(D) (second) be a disk data access interval time, and let U (gigabyte) be the amount of data to be read (gigabyte). Then, in the case of reading a file of data amount U at the access interval time T(D), consumed energy in a case where the file is saved in the RAID device 10 is calculated by the following expression.

$$P(Dread) \times U \times T(D)/3600 \text{ (watt-hour)} \qquad \text{expression 1-2}$$

On the other hand, with reference to FIG. 1, for secondary storage, the tape library device 20 is used as a tape. The tape library device 20 mainly includes the tape medium 21, the accessor 22 that conveys the tape medium 21, the tape controller 23, and the tape drive 24 that records data to the tape medium 21 and plays the recorded data. Among these components, the tape drive 24, the accessor 22 and the tape controller 23 is supplied with electric power at all times in general. The tape medium 21 is stored in the slot 25 in the device when any data is not recorded or played, and the tape medium 21 does not consume electric power. At the time of actually reading data in the tape library device 20, the accessor 22 conveys the tape medium 21 to the tape drive 24, a motor of the tape drive 24 moves a tape to a specified position in the tape medium 21, and the data is read.

Therefore, when data saved in the tape medium 21 is read, energy for motor operation of the accessor 22 and locating of the tape medium 21 by the motor of the tape drive 24 and energy required for reading of data by the tape drive 24 are consumed. Moreover, when data is not being read, electric power is also consumed by the tape controller 23, the accessor 22 and the tape drive 24 to wait. As stated above, the server 30 and the tape drive 24 are connected by the interface cable 32, and a data read request or a data write request by the server 30 is accepted.

Let Ph(Tmove) (watt-hour) be consumed energy for motor operation of the accessor 22 and locating of the tape medium 21 by the motor of the tape drive 24. The value of Ph(Tmove) is set to a value which does not depend on a data amount. Ph(Tmove) can be calculated in the following manner.

First, assuming that power consumption when causing the accessor 22 to move the tape medium 21 stored in the slot 25 is P(Tmove_acc) (watt) and a time for conveying the tape medium 21 is T(Tmove_acc) (second), consumed energy when moving the tape medium 21 in the slot 25 to the accessor 22 is given by the following expression.

$$P(Tmove\_acc) \times T(Tmove\_acc)/3600 \text{ (watt-hour)} \quad \text{expression 2-1}$$

Further, assuming that power consumption when loading the tape medium 21 to the tape drive 24 is P(Tmove_drive_load) (watt) and a time required to load is T(Tmove_drive_load) (second), consumed energy when loading the tape medium 21 to the tape drive 24 is given by the following expression.

$$P(Tmove\_drive\_load) \times T(Tmove\_drive\_load)/3600 \text{ (watt-hour)} \quad \text{expression 2-2}$$

Further, assuming that power consumption when causing the tape drive 24 to locate the tape medium 21 is P(Tmove_drive_locate) (watt) and a time spent for locating is T(Tmove_drive_locate) (second), consumed energy when locating the tape medium 21 is given by the following expression.

$$P(Tmove\_drive\_locate) \times T(Tmove\_drive\_locate)/3600 \text{ (watt-hour)} \quad \text{expression 2-3}$$

Further, assuming that power consumption when rewinding the tape of the tape medium 21 is P(Tmove_drive_rewind) (watt) and a time required to rewind is T(Tmove_drive_rewind) (second), consumed energy when rewinding the tape is given by the following expression.

$$P(Tmove\_drive\_rewind) \times T(Tmove\_drive\_rewind)/3600 \text{ (watt-hour)} \quad \text{expression 2-4}$$

Further, assuming that power consumption when unloading the tape medium 21 from the tape drive 24 is P(Tmove_drive_unload) (watt) and a time spent for unloading is T(Tmove_drive_unload) (second), consumed energy at the time of unloading is given by the following expression.

$$P(Tmove\_drive\_unload) \times T(Tmove\_drive\_unload)/3600 \text{ (watt-hour)} \quad \text{expression 2-5}$$

Meanwhile, for causing the accessor 22 to move the tape medium 21 from the tape drive 24 to the slot 25, it consumes energy which is equal to the consumed energy calculated by the expression 2-1, that is, P(Tmove_acc)×T(Tmove_acc)/3600 (watt-hour).

Ph(Tmove) is given by the following equation with the use of the expressions 2-1 to 2-5.

$Ph(Tmove)=$ $P(Tmove\_acc) \times T(Tmove\_acc)/3600 \times 2 +$ $P(Tmove\_drive\_load) \times T(Tmove\_drive\_load)/3600 +$ $P(Tmove\_drive\_locate) \times T(Tmove\_drive\_locate)/3600 +$ $P(Tmove\_drive\_rewind) \times T(Tmove\_drive\_rewind)/3600 +$ $$P(Tmove\_drive\_unload) \times T(Tmove\_drive\_unload)/3600 \text{ (watt-hour)} \quad \text{expression 2-6}$$

On the other hand, assuming that power consumption required for reading of a unit capacity by the tape is P(Tread) (watt/gigabyte) and a tape data access time (a tape processing time) is T(Tread) (second), consumed energy for reading a data amount U (gigabyte) is given by the following expression.

$$P(Tread) \times U \times T(Tread)/3600 \text{ (watt-hour)} \quad \text{expression 3-1}$$

Herein, assuming that the transfer speed of the tape drive 24 is V(Tread) (gigabytesecond), there is a relation as shown below regarding T(Tread) in the case of reading the data amount U (gigabyte).

$$T(Tread)=U/V(Tread) \text{ (second)} \quad \text{equation 3-2}$$

Substituting the equation 3-2 into the expression 3-1, the expression 3-1 is transformed into the following expression.

$$P(Tread) \times U \times U/(V(Tread) \times 3600) \text{ (watt-hour)} \quad \text{expression 3-3}$$

Herein, P(Tread) is given by the following equation, assuming that the effective capacity of the tape library device 20 is S(T) (gigabyte) and power consumption at the time of reading by the tape drive is P(Tr) (watt).

$$P(Tread)=P(Tr)/S(T) \text{ (watt/gigabyte)} \quad \text{equation 3-4}$$

Consumed energy when the tape library device 20 waits after accessing data is given by the following expression, assuming that power consumption required for waiting of the tape library device 20 per unit capacity is P(Twait) and a tape data access waiting time is T(Twait) (second).

$$P(Twait) \times U \times T(Twait)/3600 \text{ (watt-hour)} \quad \text{expression 4-1}$$

P(Twait) is given by the following equation, assuming that the effective capacity of the tape library device 20 is S(T) (gigabyte) and the standby power of the tape library device 20 is P(Tw) (watt).

$$P(Twait)=P(Tw)/S(T) \text{ (watt/gigabyte)} \quad \text{equation 4-2}$$

Consumed energy when a file is saved in the tape is given by the following expression with the use of the equation 2-6 and the expressions 3-3 and 4-1.

$$Ph(Tmove)+P(Tread) \times U \times U/(V(Tread) \times 3600)+P(Twait) \times U \times T(Twait)/3600 \quad \text{expression 5-1}$$

Herein, T(Tread) and T(Twait) relating to a tape processing time and a disk data access interval time T(D) have a relation shown by the following equation.

$$T(D)=T(Tread)+T(Twait) \quad \text{equation 6-1}$$

Further, for example, in a case where the amount of read data per reading is about 10 GB with respect to the read performance of the LTO 6 drive 160 MBs, a time required for reading is about 63 seconds. In this case, assuming that a tape processing waiting time is a few hours or more, a tape processing time T(Tread) is exceedingly smaller than the tape processing waiting time T(Twait). As in this case, in a case where the tape processing time T(Tread) is exceedingly smaller than the tape processing waiting time T(Twait), the above equation 6-1 is approximated in the following manner.

$$T(D) \approx T(Twait) \quad \text{approximate expression 6-2}$$

An expression showing a condition that the power consumption of the tape is less than the power consumption of the disk with the use of the expressions 1-2 and 5-1 is as follows.

$$P(Dread) \times U \times T(D)/3600 \geq Ph(Tmove)+P(Tread) \times U \times U/(V(Tread) \times 3600)+P(Twait) \times U \times T(Twait)/3600 \quad \text{inequality 7-1}$$

Solving the inequality 7-1 for T(D) with the use of the above approximate expression 6-2 yields the following inequality.

$$T(D) \geq \{3600 \times Ph(Tmove)+P(Tread)/V(Tread) \times U \times U\}/\{(P(Dread)-P(Wait)) \times U\} \quad \text{expression 7-2}$$

By substituting the equations 2-6, 3-4 and 4-2 into the inequality 7-2, a specific conditional expression is derived. That is, a condition of the data access interval T(D) and the data amount U that the consumed energy of the tape is less than the consumed energy of the disk are obtained.

Specific Example

Specific values will be substituted into the respective expressions and equations described above. These values are values unique to each storage device and calculated from measurement results and specifications. The present invention does not specify the calculation method.

Regarding Equation 1-1

The power consumption P(D) of the RAID device 10 is set to 2430 watts, and the effective capacity S(D) of the RAID device 10 is set to 320000 gigabytes. With regard to S(D), it is assumed that a 4-terabyte HDD is used for the RAID configuration and one logical volume is configured by eight disks. Since two disks are used as parity disks because of the RAID 6 configuration, the RAID device includes ten disks in total. One logical volume is 32 terabytes (=32000 gigabytes). In this configuration, the HDD is configured by ten logical volumes with the use of 100 disks.

Therefore, P(Dread)=2430/320000=0.007594 (watt/gigabyte) is obtained.

Regarding Expression 2-1

The power consumption P(Tmove_acc) in causing the accessor 22 to move the tape medium 21 located in the slot 25 of the tape library device 20 is set to 44 watts, and the conveyance time T(Tmove_acc) is set to 37 seconds.

Regarding Expression 2-2

The power consumption P(Tmove_drive_load) in loading the tape medium 21 to the tape drive 24 is set to 69 watts, and the time T(Tmove_drive_load) required for loading is set to 17 seconds.

Regarding Expression 2-3

The power consumption P(Tmove_drive_locate) in locating the tape medium 21 is set to 26.5 watts, and the time T(Tmove_drive_locate) required for locating is set to 63 seconds.

Regarding Expression 2-4

The power consumption P(Tmove_drive_rewind) in rewinding the tape of the tape medium 21 is set to 26.5 watts, and the time T(Tmove_drive_rewind) for rewinding is set to 63 seconds.

Regarding Expression 2-5

The power consumption P(Tmove_drive_unload) in unloading the tape medium 21 from the tape drive 24 is set to 69 watts, and the time T(Tmove_drive_unload) for unloading is set to 17 seconds.

Regarding Equation 2-6

The power consumption Ph(Tmove) at the time of movement of the tape medium 21 is 2.483 watt-hour.

Regarding Equation 3-2

The transfer speed V(Tread) of the tape drive 24 is set to 0.16 gigabytes/second by using the LTO 6 drive.

Regarding Equation 3-4

The power consumption P(Tr) at the time of reading by the tape driver 24 is set to 26.5 watts. The capacity of one LTO 6 tape medium is 2500 gigabytes, and 30 tape media can be stored in the tape library device 20. Therefore, the effective capacity S(T) of the tape library device 20 is 75000 gigabytes. Consequently, P(Tread)=26.5/75000=0.000353 (watt/gigabyte).

Regarding Equation 4-2

The standby power P(Tw) of the tape library device 20 is set to 19.5 watts, and the effective capacity S(T) of the tape library device is set to 75000 gigabytes. Therefore, P(Twait)= 0.00026 watt/gigabyte.

Figure 2:
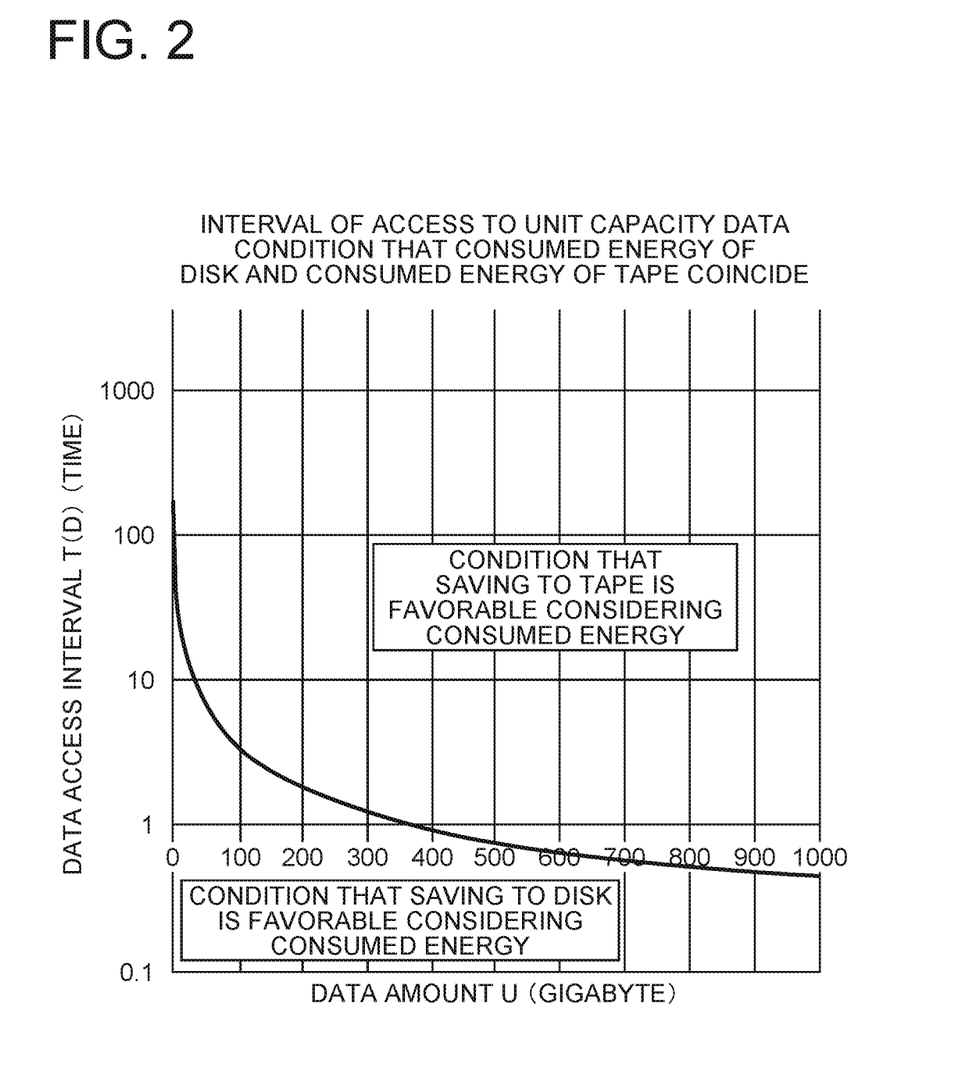
FIG. 2 is a graph showing an example of a condition for determining a file save destination which is excellent in viewpoint of consumed energy among primary storage and secondary storage on the basis of a file size and a file access interval time.

FIG. 2 is a graphic representation of the relational expression between T(D) and U shown in the inequality 7-2 with the use of the abovementioned values. In FIG. 2, the vertical axis represents the data access interval T(D) (hour), the horizontal axis represents the data amount U (gigabyte), and a solid line is drawn at a portion where the consumed energy of the disk and the consumed energy of the tape coincide. Under the condition of the upper area of the graph (an area above the solid line), consumed energy per unit capacity can be made more efficient by moving data from the disk to the tape. For example, moving data from the disk to the tape under the following conditions has the advantage of power consumption at the time of data reading.

For the data amount of 0.2 gigabyte, the access interval is equal to or more than 1673.3 hours (69.8 days)
For the data amount of 2 gigabytes, the access interval is equal to or more than 169.4 hours (7.1 days)
For the data amount of 20 gigabytes, the access interval is equal to or more than 17.0 hours.
For the data amount of 200 gigabytes, the access interval is equal to or more than 1.8 hours.

The condition generation part 41 shown in FIG. 7 generates, by the method described above, the condition shown by the graph of FIG. 2, that is, a condition for determining a file save destination that is superior in the viewpoint of consumed energy among the RAID device 10 and the tape library device 20 on the basis of a file size (corresponds to U) and a file access interval time (corresponds to T(D)).

For example, the condition generation part 41 can be configured to hold the inequality 7-2 and generate the abovementioned condition by obtaining the respective values of Ph(Tmove), P(Tread), V(Tread), P(Dread) and P(Twait) on the right side of the inequality 7-2 from, for example, the input device 36 of FIG. 6 and substituting the values into the inequality 7-2. Alternatively, the condition generation part 41 may hold a plurality of calculation expressions for calculating the values of Ph(Tmove), P(Tread), V(Tread), P(Dread) and P(Twait) on the right side of the inequality 7-2, substitute data input from the input device 36 into the calculation expressions to obtain the respective values of Ph(Tmove), P(Tread), V(Tread), P(Dread) and P(Twait), and substitute the values into the inequality 7-2. The condition generation part 41 sets the thus generated condition into the RAID access part 42 and the tape library access part 43. Meanwhile, the abovementioned condition is generated on the server 30 in this exemplary embodiment, but the abovementioned condition may be generated on a calculator that is independent of the server 30, and set to the RAID file access part 42 and the tape file access part 43 of the server 30.

Next, a process that the server 30 reads and writes a file of the RAID device 10 will be described in detail. As a premise, it is assumed that a group of data is a file and the file is saved in the RAID device 10. The server 30 accesses the file by a write request or a read request to the RAID device 10. Time t(access), which is the time that the file saved in the RAID device 10 is accessed to write or read last time, is recorded for each file on the server 30.

Figure 3:
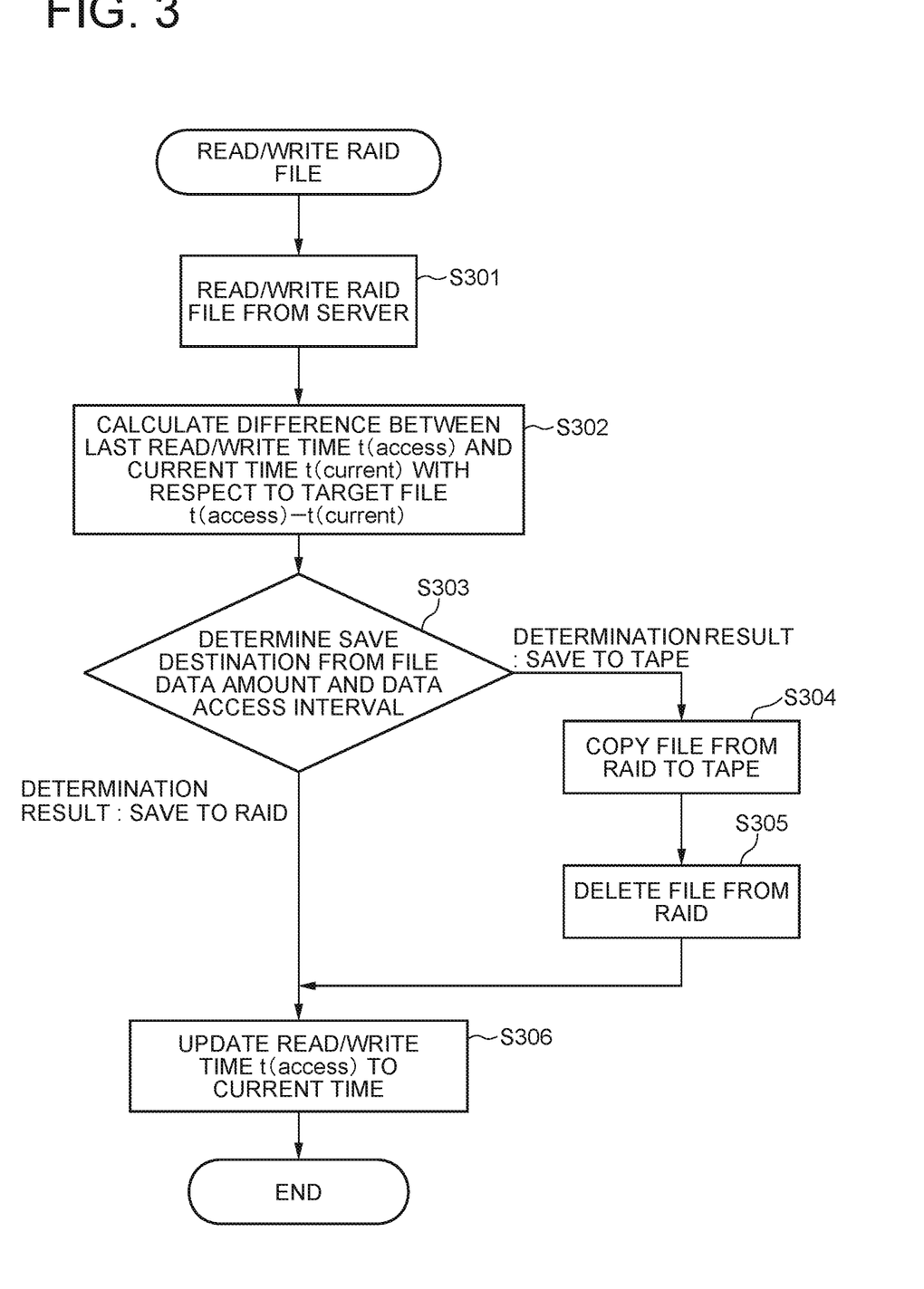
FIG. 3 is a flowchart showing an example of a process that a server reads and writes a file of a RAID device in the first exemplary embodiment of the present invention.

FIG. 3 is a flowchart showing an example of the process of reading and writing a file of the RAID device 10. With reference to FIG. 3, when read access or write access (hereinafter, referred to as readwrite access) to a certain file occurs, the RAID file access part 42 executes a read request or a write request to the file on the RAID device 10 (S301). Then, the RAID file access part 42 records time t(current), which is the time of this readwrite access, on the server 30 and calculates a difference between the t(current) and the t(access) that is the time of previous readingwriting of the same file, as an elapsed time. An elapsed time t(current)−t(access) corresponds to the data access interval T(D).

Next, in accordance with the condition expression of a data access interval to a data amount shown in FIG. 2, the RAID file access part 42 determines a file save destination this time on the basis of the data amount of the target file of this readwrite access and the data access interval (S303). In the case of determining the tape as the file save destination, the RAID file access part 42 copies the file from the RAID device 10 to the tape library device 20 (S304), and deletes the copy source file from the RAID device 10 and releases the space (S305). On the other hand, in the case of determining the RAID as the file save destination, the RAID file access part 42 leaves the file in the RAID device. Regardless of the determination, the RAID file access part 42 updates the time t(access) of the target file of this readwrite access to the current time (S306).

Next, a process that the server 30 reads a file of the tape library device 20 will be described in detail.

Figure 4:
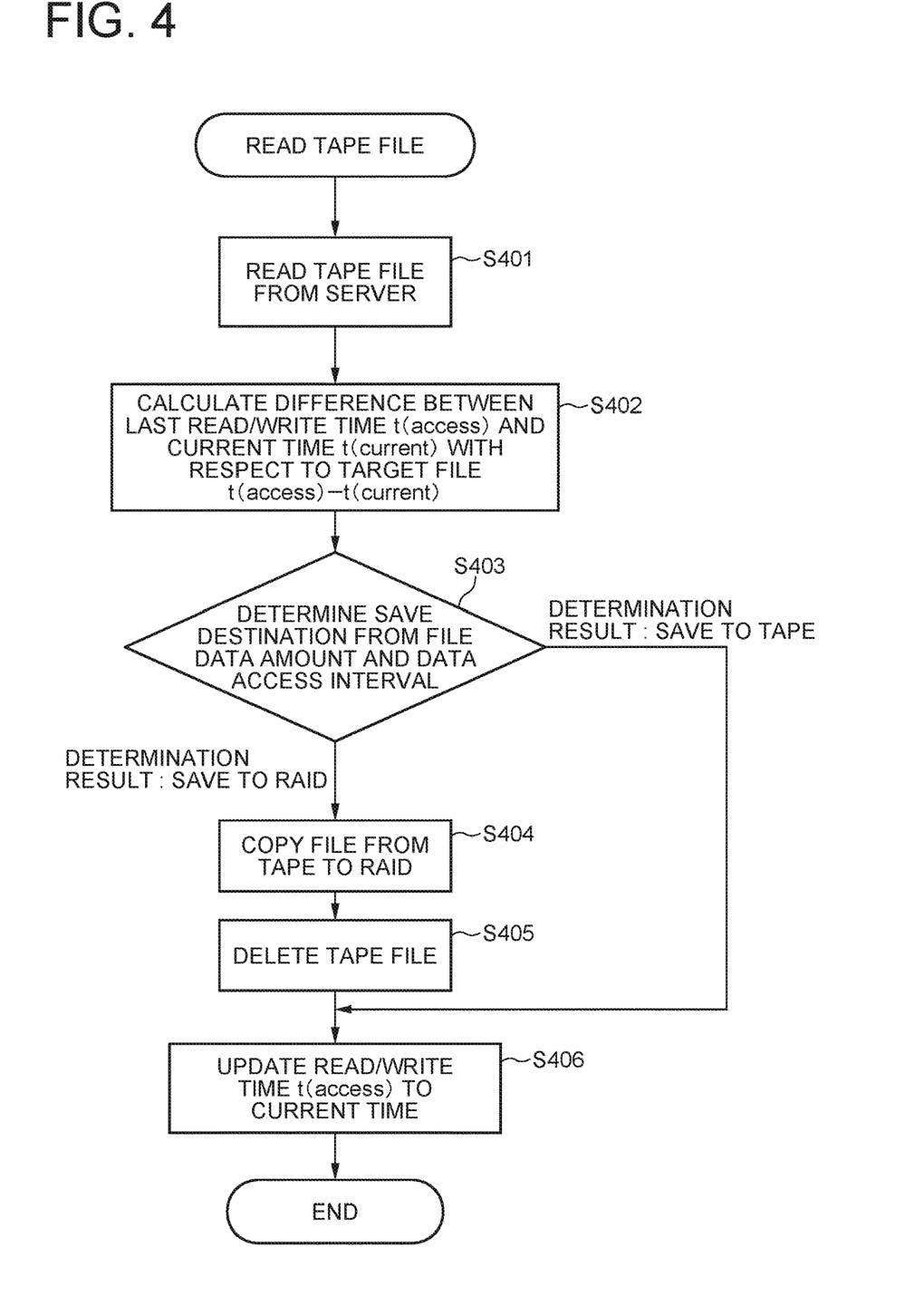
FIG. 4 is a flowchart showing an example of a process that the server reads a file of a tape library device in the first exemplary embodiment of the present invention.

FIG. 4 is a flowchart showing an example of the process of reading a file of the tape library device 20. With reference to FIG. 4, when a request to read a file having been moved to the tape library device 20 occurs, the tape file access part 43 reads the file from the tape library device 20 (S401). Then, the tape file access part 43 records the time t(current) that is the time of this reading on the server 30, and calculates a difference between the time t(current) and the time t(access) that is the time of previous readingwriting of the same file as an elapsed time (S402).

Next, in accordance with the condition expression of a data access interval to a data amount shown in FIG. 2, the tape file access part 43 determines a file save destination this time on the basis of the data amount of the target file of this read access and the data access interval (S403). In the case of determining the tape as the file save destination, the tape file access part 43 leaves the file in the tape library device 20. On the other hand, in the case of determining the RAID device as the file save destination, the tape file access part 43 copies the target file of this read access from the tape library device 20 to the RAID device 10 (S404), and deletes the copy source file of the tape library device 20 (S405). Regardless of the determination, the tape file access part 43 updates the readwrite time t(access) to the current time (S406).

Next, a process that the server 30 writes a file of the tape library device 20 will be described in detail.

Figure 5:
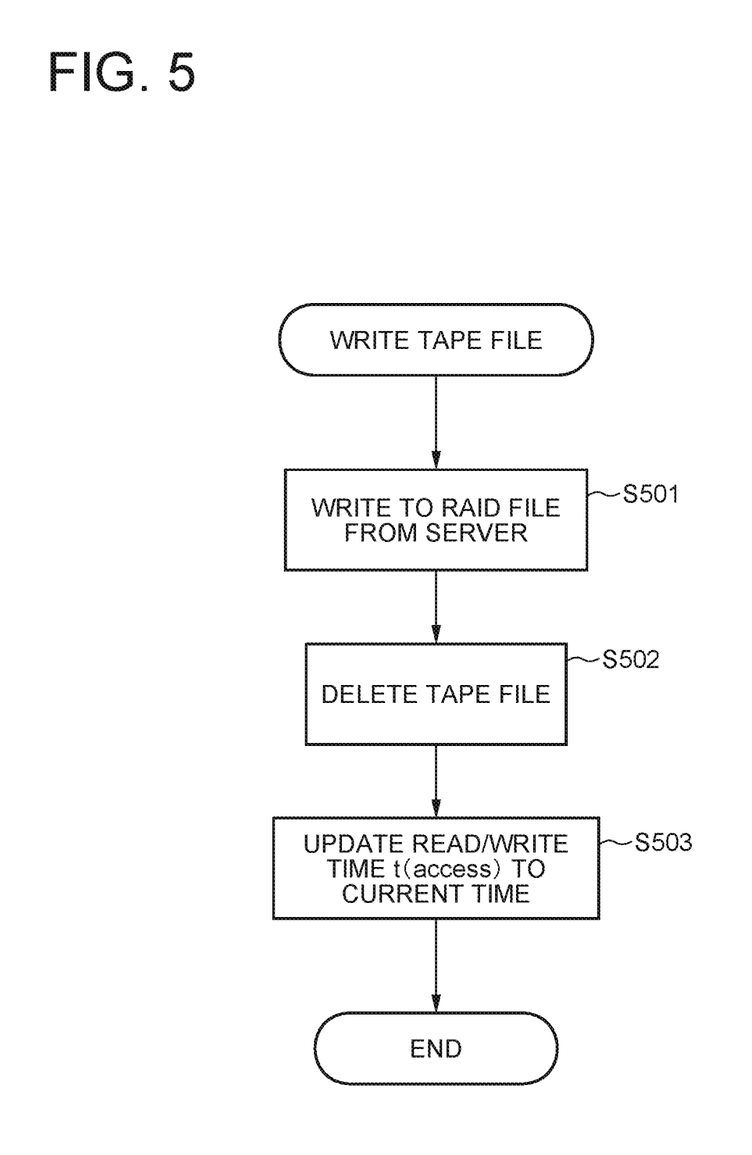
FIG. 5 is a flowchart showing an example of a process that the server writes a file of the tape library device in the first exemplary embodiment of the present invention.

FIG. 5 is a flowchart showing an example of the process that the server 30 writes a file of the tape library device 20. With reference to FIG. 5, when a request to write a file having been moved to the tape library device 20 occurs, the tape file access part 43 writes the file to the RAID device 10 (S501). After that, the tape file access part 43 deletes the copy source file from the tape library device 20 (S502). Then, the tape file access part 43 updates the readwrite time t(access) of the file to the current time (S503).

The server 30 may be configured to, when copying a file located in the RAID device 10 to the tape library device 20 or when deleting a file located in the tape library device 20, accumulate operations (copying, deleting) on a target tape medium for a given time period and schedule them, thereby reducing the number of times of loading the tape medium 21 to the tape drive 24 to achieve efficiency.

Accordingly, in this exemplary embodiment, a location-storage place is determined by using consumed energy required to save data per unit capacity as a determination material, and data is relocated by moving the data to the optimal place among the primary storage and the secondary storage. That is to say, in a case where the condition indicates that consumed energy when saving data in the secondary storage is smaller than consumed energy when saving data in the primary storage, the data is moved from the primary storage to the secondary storage. On the contrary, in a case where the condition indicates that consumed energy when saving data in the primary storage is smaller than consumed energy when saving data in the secondary storage, the data is moved from the secondary storage to the primary storage. Consequently, an effect that consumed energy required for data access of hierarchical storage is optimized can be obtained.

Second Exemplary Embodiment

Figure 8:
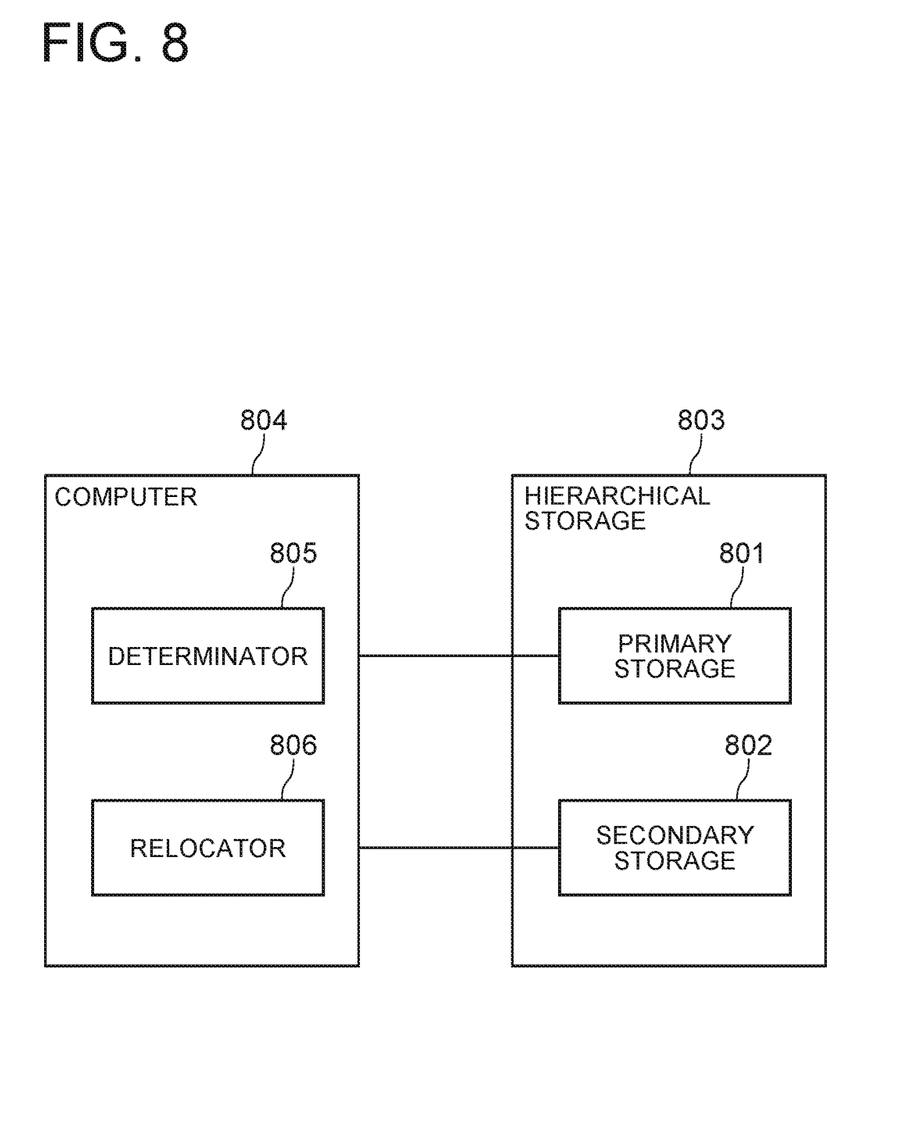
FIG. 8 is a block diagram of a hierarchical storage management system according to a second exemplary embodiment of the present invention.

With reference to FIG. 8, a storage management system 800 according to a second exemplary embodiment of the present invention includes a computer 804 that manages hierarchical storage 803 including primary storage 801 and secondary storage 802.

The computer 804 includes a determinator 805 and a relocator 806.

The determinator 805 determines, on the basis of the size of a file saved in the primary storage 801 and an access interval time, whether or not consumed energy can be reduced by moving the file from the primary storage 801 to the secondary storage 802.

The relocator 806 moves the file saved in the primary storage 801 to the secondary storage 802 in accordance with the determination by the determinator 805.

The storage management system 800 thus configured according to this exemplary embodiment operates in the following manner. That is to say, on the basis of the size of a file saved in the primary storage 801 and an access interval time, the determinator 805 determines whether or not consumed energy can be reduced by moving the file from the primary storage 801 to the secondary storage 802. Then, the relocator 806 moves the file saved in the primary storage 801 to the secondary storage 802 in accordance with the determination by the determination part 802.

Thus, according to this exemplary embodiment, the consumed energy of hierarchical storage can be suppressed by data relocation. This is because, on the basis of the size of a file saved in the primary storage 801 and an access interval time, the determinator 805 determines whether or not consumed energy can be reduced by moving the file from the primary storage 801 to the secondary storage 802, and the relocator 806 moves the file saved in the primary storage 801 to the secondary storage 802 in accordance with the determination by the determinator 805.

Although the present invention has been described above with reference to the exemplary embodiments, the present invention is not limited to the exemplary embodiments described above. The configurations and details of the present invention can be changed in various manners that can be understood by one skilled in the art within the scope of the present invention.

INDUSTRIAL APPLICABILITY

The present invention can be utilized for reducing the consumed energy of hierarchical storage.

DESCRIPTION OF REFERENCE NUMERALS

10 RAID device
11 RAID controller
12 hard disk
20 tape library device
21 tape medium
22 accessor
23 tape controller
24 tape drive
25 slot
30 server
31 interface cable
32 interface cable
33 CPU
34 memory
35 storage device
36 input device
37 output device
38 interface
39 interface
40 hierarchical storage management part
41 condition generation part
42 RAID file access part
43 tape file access part
100 storage management system
800 storage management system
801 primary storage
802 secondary storage
803 hierarchical storage
804 computer
805 determinator
806 relocator

The invention claimed is:

1. A hierarchical storage management system including magnetic tape devices that are primary storage and secondary storage, the hierarchical storage management system comprising:
a determinator for, on a basis of a size of a file saved in the primary storage, an access interval time of the file, consumed energy for motor operation of an accessor of the secondary storage and for locating of a tape medium by a motor of the secondary storage, power consumption required for reading of a unit capacity by the secondary storage, a transfer speed of the secondary storage, power consumption required for reading of a unit data capacity by the primary storage, and power consumption required to wait of the secondary storage per unit capacity, making a determination whether or not moving the file from the primary storage to the secondary storage can reduce consumed energy; and
a relocator for, in accordance with the determination, moving the file from the primary storage to the secondary storage,
wherein a condition that the secondary storage is superior to the primary storage in viewpoint of consumed energy can be given by a following inequality:

$$T(D) \geq \{3600 \times Ph(Tmove) + P(Tread)/V(Tread) \times U \times U\}/\{P(Dread) - P(Twait) \times U\},$$

where the access interval time is $T(D)$, the size is $U$, the consumed energy for motor operation of an accessor and locating a tape medium by a motor of the tape drive in the secondary storage is $Ph(Tmove)$, the power consumption required to read a unit capacity by the secondary storage is $P(Tread)$, the transfer speed of the tape drive of the secondary storage is $V(Tread)$, the power consumption required to read a unit data capacity by the primary storage is $P(Dread)$, and the power consumption required to wait of the secondary storage per unit capacity is $P(Twait)$.

2. A file movement method by a hierarchical storage management system including magnetic tape devices that are primary storage and secondary storage, the file movement method comprising:
on a basis of a size of a file saved in the primary storage, an access interval time of the file, consumed energy for motor operation of an accessor of the secondary storage and for locating of a tape medium by a motor of the secondary storage, power consumption required for reading of a unit capacity by the secondary storage, a transfer speed of the secondary storage, power consumption required for reading of a unit data capacity by the primary storage, and power consumption required to wait of the secondary storage per unit capacity, making a determination whether or not moving the file from the primary storage to the secondary storage can reduce consumed energy; and
in accordance with the determination, moving the file from the primary storage to the secondary storage,
wherein a condition that the secondary storage is superior to the primary storage in viewpoint of consumed energy can be given by a following inequality:

$$T(D) \geq \{3600 \times Ph(Tmove) + P(Tread)/V(Tread) \times U \times U\}/\{P(Dread)P(Twait) \times U\},$$

where the access interval time is $T(D)$, the size is $U$, the consumed energy for motor operation of an accessor and locating a tape medium by a motor of the tape drive in the secondary storage is $Ph(Tmove)$, the power consumption required to read a unit capacity by the secondary storage is $P(Tread)$, the transfer speed of the tape drive of the secondary storage is $V(Tread)$, the power consumption required to read a unit data capacity by the primary storage is $P(Dread)$, and the power consumption required to wait of the secondary storage per unit capacity is $P(Twait)$.

3. A non-transitory computer-readable medium storing a program comprising instructions for causing a computer to function as a determinator and a relocator, the computer managing hierarchical storage including magnetic tape devices that are primary storage and secondary storage, wherein:

the determinator makes a determination, on a basis of a size of a file saved in the primary storage, an access interval time of the file, consumed energy for motor operation of an accessor of the secondary storage and for locating of a tape medium by a motor of the secondary storage, power consumption required for reading of a unit capacity by the secondary storage, a transfer speed of the secondary storage, power consumption required for reading of a unit data capacity by the primary storage, and power consumption required to wait of the secondary storage per unit capacity, whether or not moving the file from the primary storage to the secondary storage can reduce consumed energy; and the relocator moves the file from the primary storage to the secondary storage in accordance with the determination, wherein a condition that the secondary storage is superior to the primary storage in viewpoint of consumed energy can be given by a following inequality:

$$T(D) \geq \{3600 \times Ph(Tmove) + P(Tread)/V(Tread) \times U \times U\}/\{P(Dread) - P(Twait) \times U\},$$

where the access interval time is T(D), the size is U, the consumed energy for motor operation of an accessor and locating a tape medium by a motor of the tape drive in the secondary storage is Ph(Tmove), the power consumption required to read a unit capacity by the secondary storage is P(Tread), the transfer speed of the tape drive of the secondary storage is V(Tread), the power consumption required to read a unit data capacity by the primary storage is P(Dread), and the power consumption required to wait of the secondary storage per unit capacity is P(Twait).

* * * * *